(12) United States Patent
Dain et al.

(10) Patent No.: US 10,686,754 B2
(45) Date of Patent: *Jun. 16, 2020

(54) IN-BAND LDAP OVER FICON

(71) Applicant: INTERNATIONAL BUSINESS MACHINES CORPORATION, Armonk, NY (US)

(72) Inventors: Joseph W. Dain, Vail, AZ (US); Karla J. Lehmann, Tucson, AZ (US); Stefan Lehmann, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,250

(22) Filed: Jul. 28, 2018

(65) Prior Publication Data
US 2018/0337883 A1   Nov. 22, 2018

Related U.S. Application Data

(63) Continuation of application No. 14/742,100, filed on Jun. 17, 2015, now Pat. No. 10,116,618.

(51) Int. Cl.
*H04L 29/12* (2006.01)
*H04L 29/06* (2006.01)
*H04L 12/46* (2006.01)

(52) U.S. Cl.
CPC ......... *H04L 61/2007* (2013.01); *H04L 69/12* (2013.01); *H04L 12/4633* (2013.01); *H04L 61/1523* (2013.01)

(58) Field of Classification Search
CPC . H04L 1/0057; H04L 29/12028; H04L 69/16; H04L 41/06; H04J 3/14; G06F 3/0619; G06F 3/0683
See application file for complete search history.

(56) References Cited

U.S. PATENT DOCUMENTS

| | | |
|---|---|---|
| 6,665,674 B1 | 12/2003 | Buchanan et al. |
| 6,694,375 B1 | 2/2004 | Beddus et al. |
| 7,043,480 B2 | 5/2006 | Trivedi |
| 7,356,814 B1 | 4/2008 | McQueeny |
| 7,702,762 B1 | 4/2010 | Venkata |
| 7,873,678 B2 | 1/2011 | Tonev et al. |
| 9,921,770 B1 * | 3/2018 | Feeney ................. G06F 3/0683 |

(Continued)

FOREIGN PATENT DOCUMENTS

WO   03077114 A2   9/2003

*Primary Examiner* — Dustin Nguyen
(74) *Attorney, Agent, or Firm* — Griffiths & Seaton PLLC

(57) ABSTRACT

Embodiments for exchanging data information packets, by a processor device, include writing an Internet Protocol (IP) information unit received by a host node executing a Fibre Connection (FICON) software library to a transport layer by converting the IP information unit to FICON payload and placing the FICON payload into a shared memory space of the host node; and transmitting data including the IP information unit to a target node by accessing the FICON payload in the shared memory by a FICON adapter of the host node and transferring the FICON payload to the target node over a FICON network.

21 Claims, 3 Drawing Sheets

(56) References Cited

U.S. PATENT DOCUMENTS

| | | | |
|---|---|---|---|
| 2004/0054776 A1* | 3/2004 | Klotz | H04L 41/06 |
| | | | 709/224 |
| 2005/0234941 A1 | 10/2005 | Watanabe et al. | |
| 2006/0028947 A1* | 2/2006 | Elliott | G06F 3/0619 |
| | | | 369/53.41 |
| 2006/0092125 A1 | 5/2006 | Kisley et al. | |
| 2006/0165119 A1* | 7/2006 | Dugan | H04L 29/12028 |
| | | | 370/466 |
| 2006/0187960 A1 | 8/2006 | Murakami et al. | |
| 2008/0263640 A1 | 10/2008 | Brown | |
| 2011/0126074 A1* | 5/2011 | Calderon | H04L 1/0057 |
| | | | 714/752 |
| 2012/0093149 A1 | 4/2012 | Blair et al. | |
| 2012/0213507 A1* | 8/2012 | DeCusatis | H04J 3/14 |
| | | | 398/24 |
| 2013/0024549 A1 | 1/2013 | Espino | |
| 2013/0054821 A1* | 2/2013 | Ben-Amos | H04L 69/16 |
| | | | 709/228 |
| 2015/0381530 A1 | 12/2015 | Hathorn | |

* cited by examiner

IN-BAND LDAP OVER FICON

CROSS REFERENCE TO RELATED APPLICATIONS

This Application is a Continuation of U.S. Pat. No. 10,116,618, filed on Jun. 17, 2015.

BACKGROUND OF THE INVENTION

Field of the Invention

The present invention relates in general to computers, and more particularly to a method, system, and computer program product for conveying in-band Internet Protocol (IP) traffic using Fibre Connectivity (FICON).

Description of the Related Art

In today's society, computer systems are commonplace. Computer systems may be found in the workplace, at home, or at school. In computer networking, a protocol stack comprises a prescribed hierarchy of software layers, starting from the application layer at the top (the source of the data being sent) to the physical layer at the bottom (transmitting the bits on the wire). Elements of the protocol stack include an application layer, a transport layer, a network layer, a data-link layer and a physical layer.

Many transport layers and transfer protocols exist in computer networking. One example includes FICON which is a high-speed input/output (I/O) interface for mainframe computers connections to storage devices introduced by IBM® in 1998.

SUMMARY OF THE DESCRIBED EMBODIMENTS

Various embodiments for exchanging data information packets, by a processor device, are provided. In one embodiment, a method comprises writing an Internet Protocol (IP) information unit received by a host node executing a Fibre Connection (FICON) software library to a transport layer by converting the IP information unit to FICON payload and placing the FICON payload into a shared memory space of the host node; and transmitting data including the IP information unit to a target node by accessing the FICON payload in the shared memory by a FICON adapter of the host node and transferring the FICON payload to the target node over a FICON network.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As aforementioned, Fibre Connectivity (FICON) is a high-speed input/output (I/O) interface for mainframe computers connections to storage devices introduced by IBM® in 1998. FICON is an implementation to transfer Enterprise Systems Connection (ESCON) protocol over Fibre Channel (FC). Many users within a mainframe system or network using FICON connectivity use the Lightweight Directory Access Protocol (LDAP) for security and directory information within the network. LDAP is an open, vendor-neutral, industry standard application protocol for accessing and maintaining distributed directory information services over an Internet Protocol (IP) network.

Since LDAP relies on a TCP/IP network to secure distributed directory information, all mainframe implementations using FICON must also hold an external TCP/IP network connection to access LDAP data. This creates an inefficient redundancy within the mainframe system which is then connected to both FICON and IP networks. FICON networks are inherently faster, more secure, more efficient, and more stable than IP networks, yet mainframe systems must connect to both FICON and IP networks, often entirely to service LDAP data requests.

The present invention provides various embodiments to encapsulate IP information units, or data, and more specifically, LDAP data, to be transferred via the faster, more efficient FICON network. As will be further described, IP LDAP traffic may be converted to FICON payload to be transferred over the FICON network, or may be transported parallel to existing FICON data traffic. The mechanisms of the present invention provide for improved security, improved reliability, and most importantly, the elimination of an external network to transport LDAP data requests by processing the requests in-band over FICON.

Figure 1:
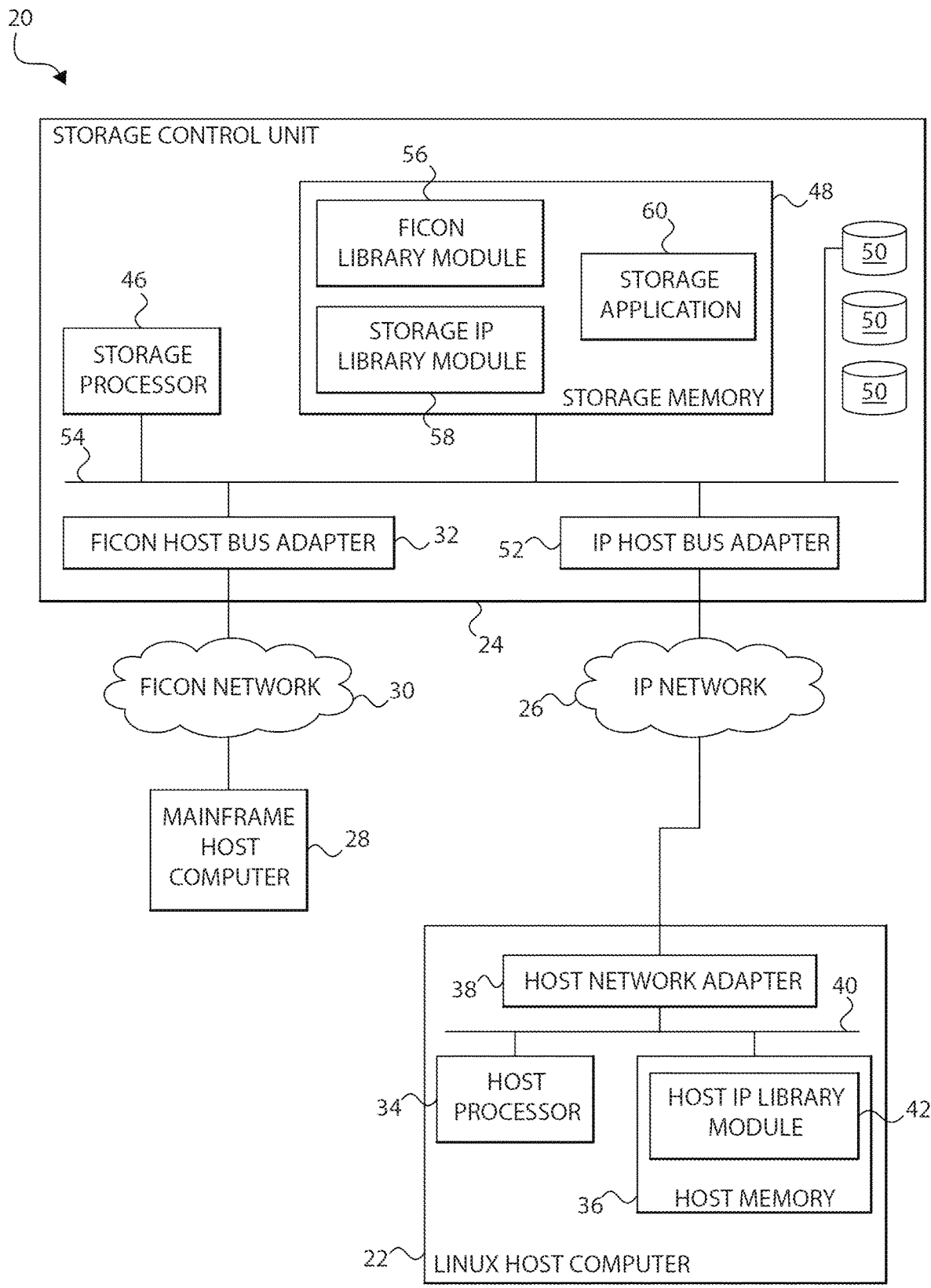
FIG. 1 is a block diagram illustrating a system configured to convey Internet Protocol (IP) information units over a Fibre Connection (FICON) network according to one embodiment of the present invention.

Turning now to the Figures, FIG. 1 is a schematic pictorial illustration of a system 20, in which one embodiment of the present invention may be implemented. System 20 may be configured to convey Internet Protocol (IP) information units from a host computer 28 to a storage control unit 24 over a Fibre Connection (FICON) network 30, in accordance with certain aspects of the present invention. Storage control unit 24 can also communicate with a Linux host computer 22 over an IP network 26, via an IP host bus adapter (HBA) 52. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage control unit 24 receives, from host computers 22 and 28, input/output (I/O) requests, which are commands to read or write data at logical addresses on logical volumes, or in this example, LDAP requests. In addition to host computers 22 and 28, any number of additional host computers (not shown) may be coupled to storage control unit 24 by any means known in the art, for example, using networks 26 and 30. Herein, by way of example, host computer 22 and storage control unit 24 are assumed to be coupled by IP network 26, and mainframe host 28 and the storage control unit are assumed to be coupled by FICON network 30.

In some configurations, storage control unit 24 may comprise multiple sets of storage devices 50. Each set of storage devices 50 comprises multiple slow and/or fast access time mass storage devices, herein below assumed to be multiple hard disks. Typically, the sets of storage devices 50 comprise one or more disks, which can have different performance characteristics.

It will be understood that system 20, and thereby, storage control unit 24, may comprise any convenient number of the network interfaces. Subsequent to the formation of storage devices 50, the network interfaces receive I/O commands from host computers 22 and 28 specifying logical addresses of storage devices 50. The network interfaces use the routing records to break the commands into I/O instructions, or command subsets, that are then distributed among caches (not shown) in the storage control unit.

Storage control unit 24 is operative to monitor its state, and to transmit configuration information to other components of system 20, for example, configuration changes that result in blocking intervals, or limit the rate at which I/O requests for the sets of storage devices 50 are accepted.

Data having contiguous logical addresses are generally distributed among the storage devices. Alternatively, the data can be distributed using other algorithms, e.g., byte or block interleaving. In general, this increases bandwidth, for instance, by allowing a volume coupled via the (IP and FICON) networks, or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of storage devices 50.

While not explicitly shown for purposes of illustrative simplicity, the skilled artisan will appreciate that in some embodiments, storage control unit 24 may be adapted for implementation in conjunction with certain hardware, such as a rack mount system, a midplane, and/or a backplane. Additional hardware such as the aforementioned switches, processors, controllers, memory devices, and the like may also be incorporated into storage control unit 24 and elsewhere within the system 20, again as the skilled artisan will appreciate. Further, a variety of software components, operating systems, firmware, and the like may be integrated.

Linux™ Host computer 22 comprises a host processor 34, a host memory 36, and a host network adapter 38, all coupled via a bus 40. Host computer 22 communicates with IP network 26 via host network adapter 38. While FIG. 1 shows host computer 28 configured to convey IP information units to storage control unit 24 over FICON network 30, other types of host computers executing other operating systems (e.g., Windows™) may also be configured to convey IP commands over the FICON network using embodiments described herein, and are thus considered to be within the spirit and scope of the present invention.

Storage control unit 24 comprises FICON HBA 32, a storage processor 46, a storage memory 48, CKD storage devices 50, and an IP HBA 52, all coupled via a bus 54. Storage processor 46 executes a FICON library module 56, a storage IP library module 58, and a storage application 60 from storage memory 48, and communicates with IP network 26 via IP HBA 52.

Storage application 60 is configured to process input/output (I/O), LDAP, or other requests (conveyed via a FICON information unit), transfer data from/to CKD storage devices 50, and convey the result of the I/O requests (e.g., an acknowledgement of a write operation, or the retrieved data of a read operation) to host computers 22 and 28 via their respective networks. CKD storage devices 50 typically comprise a combination of high capacity hard disk drives and solid-state disk drives.

Storage IP library module 60 can be configured to write a FICON information unit to a transport layer, and to transmit data including the FICON information unit to Linux™ host computer 22 via IP network 26, and host IP library module 42 can be configured to extract the FICON information unit from data received via host network adapter 38. Likewise, FICON library module 56 can be configured to write a FICON information unit to a transport layer, and to transmit data including the FICON information unit to mainframe host computer 28 over FICON network 30 via FICON HBA 32.

Processors 34 and 46 typically comprise general-purpose computers configured to carry out the functions described herein. Software operated by the processors may be downloaded to the memories in electronic form, over a network, for example, or it may be provided on non-transitory tangible media, such as optical, magnetic or electronic memory media. Alternatively, some or all of the functions of the processors may be carried out by dedicated or programmable digital hardware components, or by using a combination of hardware and software elements.

Figure 2:
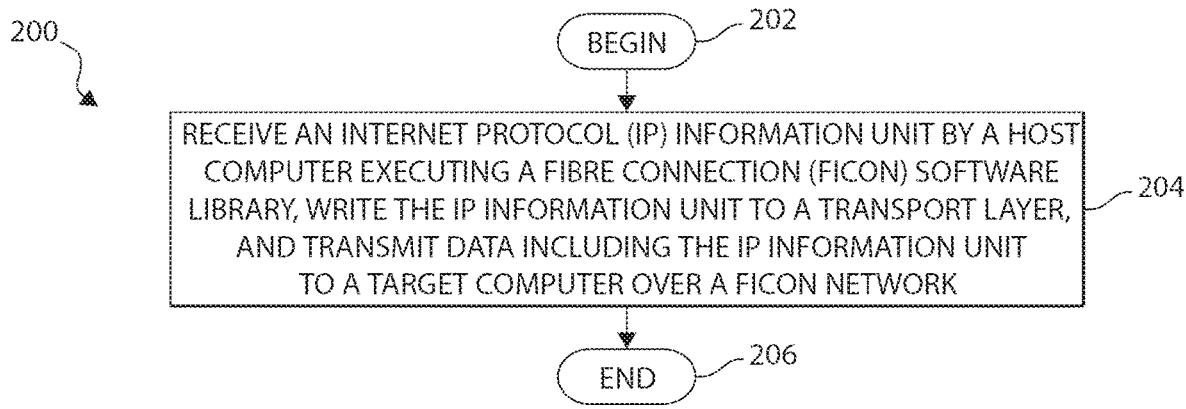
FIG. 2 illustrates a flow chart of a method according to one embodiment of the present invention.

FIG. 2 illustrates a method 200 of transporting IP information units, or data, and more specifically LDAP request data over a FICON network. Beginning at step 202, an IP information unit is received by a host computer, or node, executing a FICON software library, the IP information unit is written to a transport layer, and data, including the IP information unit is transmitted to a target computer, or node, over a FICON network (step 204). The method ends 206.

Figure 3:
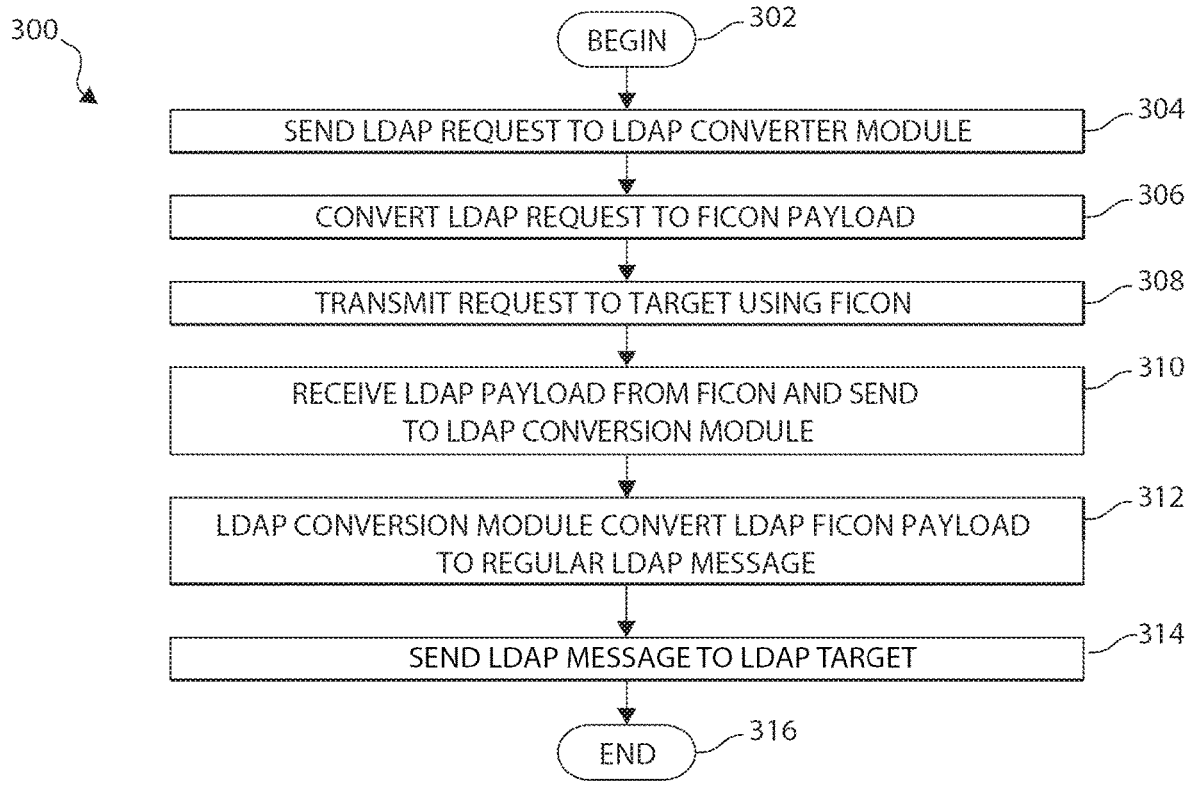
FIG. 3 illustrates an additional flow chart of a method according to one embodiment of the present invention.

FIG. 3 illustrates a method 300 according to one embodiment of the present invention. Beginning at step 302, an LDAP request is sent to an LDAP converter module (step 304). This may be achieved, for example, by sending a message to an IP address where the converter module is listening, by using shared memory, or any other such communication method. The LDAP request is then converted to FICON payload (step 306). In one example, the LDAP request may be formatted and placed into the memory space of the FICON code in which the FICON adapter accesses the memory space and sends the payload. The LDAP request is then transmitted to the target node using FICON (step 308). The target node receives the LDAP payload from the FICON network and sends the payload to the LDAP conversion module (step 310). The receiving target may here again receive the FICON payload with the LDAP request and place it in the FICON memory space, where it may be formatted or converted. The LDAP conversion module receiving the LDAP request then converts the LDAP FICON payload to a regular LDAP message (step 312). The LDAP message is then sent to the LDAP target (step 314). The method ends (step 316).

In the aforementioned example, the regular LDAP processing is isolated from the underlying communication method which enables the use of LDAP services by a host or target node "out of the box", requiring no changes to utilize LDAP services. The LDAP request is transmitted normally to an IP address where it is received by LDAP conversion module, put into FICON payload, and transmitted using the FICON protocol. The target then extracts the LDAP request from the FICON payload, converts the request, and delivers the request to the to the receiver. In this way, LDAP processes are unaware that the LDAP requests are actually being transmitted over FICON.

Figure 4:
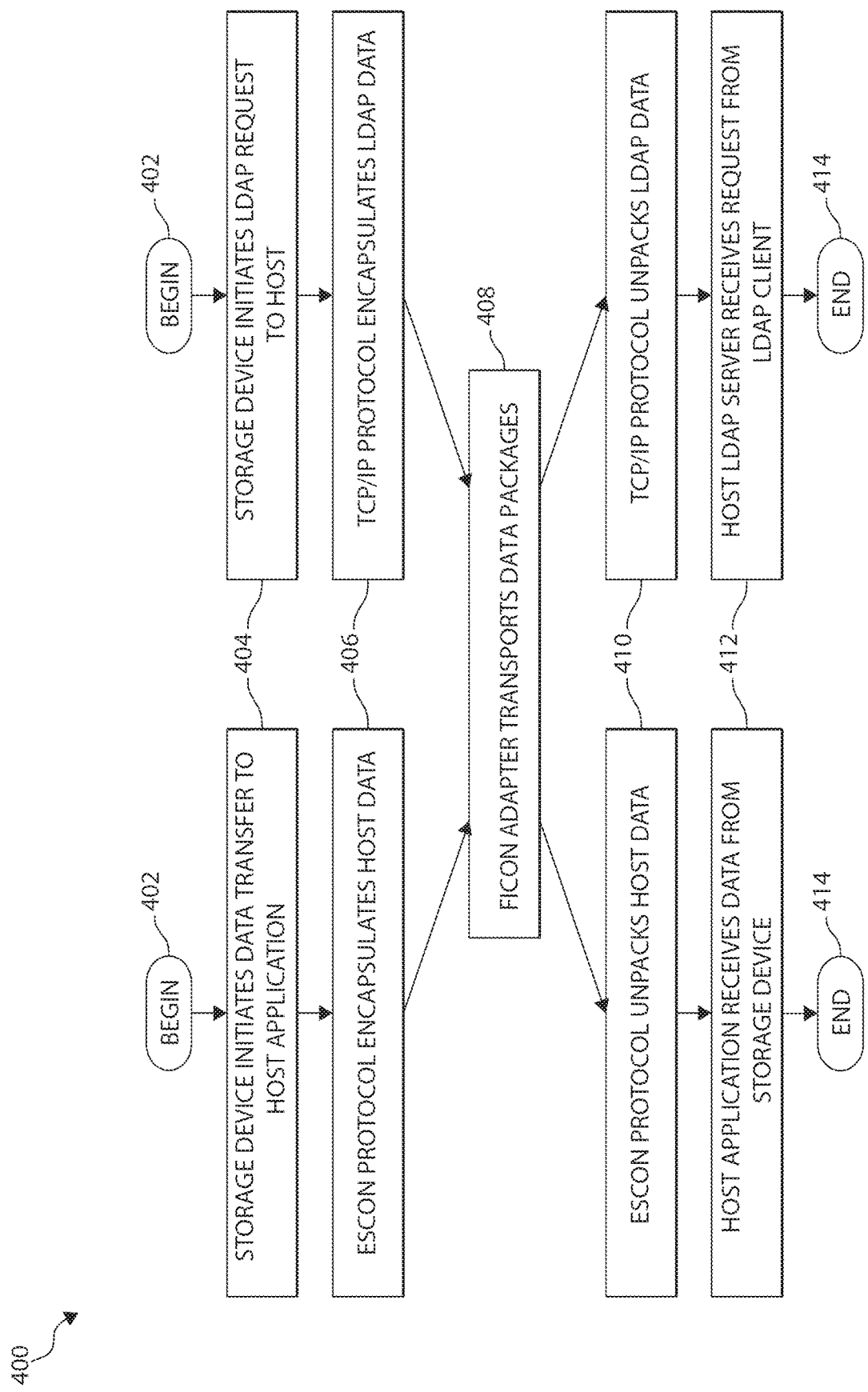
FIG. 4 illustrates still an additional flow chart of a method according to one embodiment of the present invention.

In another embodiment, IP information units, or data traffic, may be transported in parallel to existing ESCON protocol FICON data traffic, as illustrated by method 400 in FIG. 4. Beginning at 402, a storage device initiates a data transfer to a host application, while at the same time a storage device initiates an LDAP request to a host (step 404). The ESCON protocol encapsulates host data, while the TCP/IP protocol encapsulates LDAP data (step 406). The FICON adapter then transfers both the ESCON and IP data payload to the target (step 408). The ESCON protocol unpacks the host data while the TCP/IP protocol unpacks the LDAP data (step 410). The host application then receives the data from the storage or other device, while the host LDAP server receives the request from the LDAP client (step 412). The method ends (step 414).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for exchanging data information packets, by a processor device, comprising:
    writing an Internet Protocol (IP) information unit received by a host node executing a Fibre Connection (FICON) software library to a transport layer by converting the IP information unit to FICON payload and placing the FICON payload into a shared memory space of the host node; and
    transmitting data including the IP information unit to a target node by accessing the FICON payload in the shared memory by a FICON adapter of the host node and transferring the FICON payload to the target node over a FICON network.

2. The method of claim 1, further including receiving the data including the IP information unit from the FICON network by the target node executing a FICON software library; and
    extracting the IP information unit from the transport layer.

3. The method of claim 2, further including conveying the extracted IP information unit to an application executing on the target node.

4. The method of claim 1, further including initializing a network connection between the host node and the target node, prior to receiving the IP information unit.

5. The method of claim 1, further including transmitting the IP information unit in parallel to FICON data, from the host node to the target node.

6. The method of claim 1, wherein the transport layer is an Enterprise Systems Connection (ESCON) protocol.

7. The method of claim 1, wherein the IP information unit comprises a Lightweight Directory Access Protocol request.

8. A system for exchanging data information packets, comprising:
    at least one processor device operating within a host node executing a Fibre Connection (FICON) software library, wherein the at least one processor device:
        writes an Internet Protocol (IP) information unit received by a host node executing a Fibre Connection (FICON) software library to a transport layer by converting the IP information unit to FICON payload and placing the FICON payload into a shared memory space of the host node; and
        transmits data including the IP information unit to a target node by accessing the FICON payload in the shared memory by a FICON adapter of the host node and transferring the FICON payload to the target node over a FICON network.

9. The system of claim 8, wherein the at least one processor device receives the data including the IP information unit from the FICON network by the target node executing a FICON software library, and
    extracts the IP information unit from the transport layer.

10. The system of claim 9, wherein the at least one processor device conveys the extracted IP information unit to an application executing on the target node.

11. The system of claim 8, wherein the at least one processor device initializes a network connection between the host node and the target node, prior to receiving the IP information unit.

12. The system of claim 8, wherein the at least one processor device transmits the IP information unit in parallel to FICON data, from the host node to the target node.

13. The system of claim 8, wherein the transport layer is an Enterprise Systems Connection (ESCON) protocol.

14. The system of claim 8, wherein the IP information unit comprises a Lightweight Directory Access Protocol request.

15. A computer program product for exchanging data information packets by at least one processor device operable within a host node executing a Fibre Connection (FICON) software library, the computer program product comprising a non-transitory computer-readable storage medium having computer-readable program code portions stored therein, the computer-readable program code portions comprising:
    an executable portion that writes an Internet Protocol (IP) information unit received by a host node executing a Fibre Connection (FICON) software library to a transport layer by converting the IP information unit to FICON payload and placing the FICON payload into a shared memory space of the host node; and
    an executable portion that transmits data including the IP information unit to a target node by accessing the FICON payload in the shared memory by a FICON adapter of the host node and transferring the FICON payload to the target node over a FICON network.

16. The computer program product of claim 15, further including an executable portion that receives the data including the IP information unit from the FICON network by the target node executing a FICON software library; and
extracts the IP information unit from the transport layer.

17. The computer program product of claim 16, further including an executable portion that conveys the extracted IP information unit to an application executing on the target node.

18. The computer program product of claim 15, further including an executable portion that initializes a network connection between the host node and the target node, prior to receiving the IP information unit.

19. The computer program product of claim 15, further including an executable portion that transmits the IP information unit in parallel to FICON data, from the host node to the target node.

20. The computer program product of claim 15, wherein the transport layer is an Enterprise Systems Connection (ESCON) protocol.

21. The computer program product of claim 15, wherein the IP information unit comprises a Lightweight Directory Access Protocol request.

* * * * *